No. 705,630. Patented July 29, 1902.
R. ALEXANDER-KATZ.
SEPARATOR FOR ELECTRIC ACCUMULATOR PLATES.
(Application filed Oct. 18, 1901.)
(No Model.)
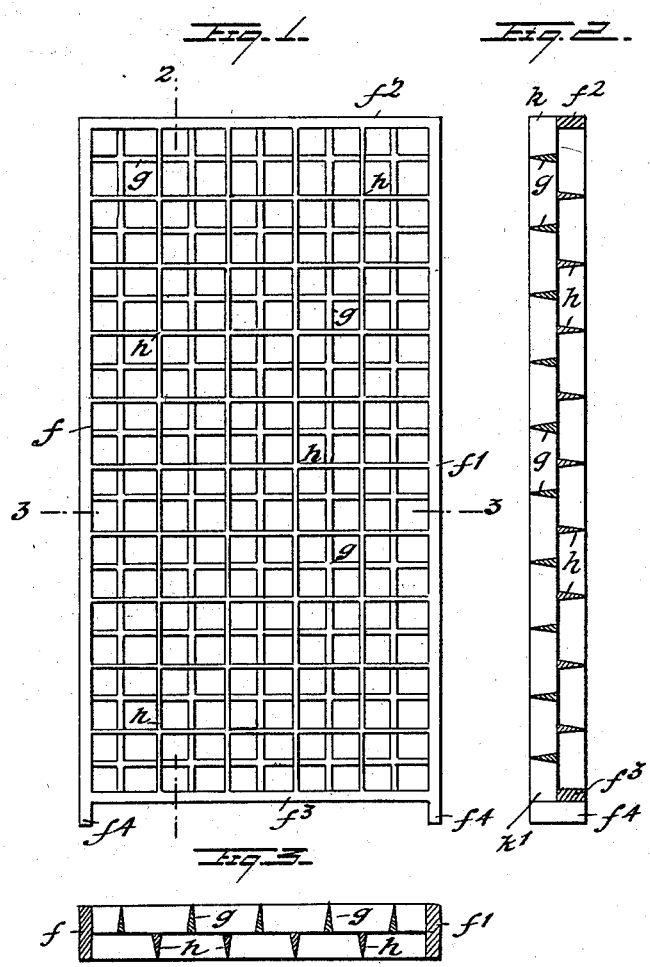

United States Patent Office.

RICHARD ALEXANDER-KATZ, OF BERLIN, GERMANY.

SEPARATOR FOR ELECTRIC ACCUMULATOR-PLATES.

SPECIFICATION forming part of Letters Patent No. 705,630, dated July 29, 1902.

Application filed October 18, 1901. Serial No. 79,185. (No model.)

*To all whom it may concern:*

Be it known that I, RICHARD ALEXANDER-KATZ, a subject of the German Emperor, residing and having my post-office address at Leipzigerstrasse 19, Berlin, Germany, have invented certain new and useful Improvements in Separators for Electric Accumulator-Plates, of which the following is a specification.

This invention relates to a separator for the plates of electric accumulators, and is intended to provide a removable separator which shall allow circulation of the electrolyte and disengagement of gases, as well as act to support the negative and positive plates and the surfaces thereof.

In the annexed drawings, Figure 1 is an elevation of said separator. Fig. 2 is a cross-section thereof on line 2 2. Fig. 3 is a cross-section thereof on line 3 3.

The separator consists of marginal bars $f$ $f'$ $f^2$ $f^3$ and two wide-meshed gratings $g$ $h$, so located with regard to one another that the intersections of the bars of the one grating cross the open spaces of the other grating. The exterior surface of each grating is plane and flush with the edges of the marginal bars or some of them, more particularly of the side bars $f$ $f'$, and the interior surfaces of the gratings are also preferably both in the plane of contact of the gratings one with the other. The gratings are preferably integral with one another and with the marginal bars, being made in one piece of a suitable non-conductive material of light weight, such as caoutchouc or celluloid. The top and bottom bars $f^2$ $f^3$ are for the whole or some part of their length of less thickness, as at $k$ $k'$, to allow space for disengagement of gases and circulation of electrolyte, and the side bars $f$ $f'$ are preferably prolonged downwardly for a short distance below the bottom bar $f^3$ to form feet, as at $f^4$, on which the separator stands when in position in the cell.

It will be seen from the foregoing description and illustration that there is ample and substantial equal passage for the electrolyte vertically and horizontally at all parts of the separator and that the surfaces of the separator which come in contact with the surfaces of the plates of the cell support the latter along numerous uninterrupted lines, the support thus afforded being substantially equal in vertical and horizontal direction for any particular area of the plate.

What I claim is—

1. A non-conducting separator for electric accumulator-plates comprising in combination two wide-meshed gratings, whereof the intersections of the one cross the open spaces of the other, the outer edges of said gratings all being in the same plane.

2. A non-conducting separator for electric accumulator-plates comprising in combination marginal bars and two wide-meshed gratings whereof the intersections of the one cross the open spaces of the other, the outer edges of said gratings all being in the same plane and flush with surfaces of the marginal bars.

3. A non-conducting separator for electric accumulator-plates comprising in combination two wide-meshed gratings, whereof the intersections of the one cross the open spaces of the other, the outer edges of said gratings all being in the same plane, and being made integral with one another.

4. A non-conducting separator for electric accumulator-plates comprising in combination marginal bars and two wide-meshed gratings whereof the intersections of the one cross the open spaces of the other, the outer edges of said gratings all being in the same plane and flush with surfaces of the marginal bars, and being made integral with one another and with the marginal bars.

5. A non-conducting separator for electric accumulator-plates comprising in combination two wide-meshed gratings, whereof the intersections of the one cross the open spaces of the other, the outer edges of said gratings all being in the same plane, and terminating at their meeting surface in a plane.

6. A non-conducting separator for electric accumulator-plates comprising in combination marginal bars and two wide-meshed gratings whereof the intersections of the one cross the open spaces of the other, the outer edges of said gratings all being in the same plane and flush with surfaces of the marginal bars, and terminating at their meeting surfaces in a plane bisecting said marginal bars.

In witness whereof I have signed this specification in the presence of two witnesses.

RICHARD ALEXANDER-KATZ.

Witnesses:
 WOLDEMAR HAUPT,
 HENRY HASPER.